No. 810,859. PATENTED JAN. 23, 1906.
P. A. HANEGRAAF.
FAMILY COOK AND FRYING PAN.
APPLICATION FILED NOV. 30, 1904.
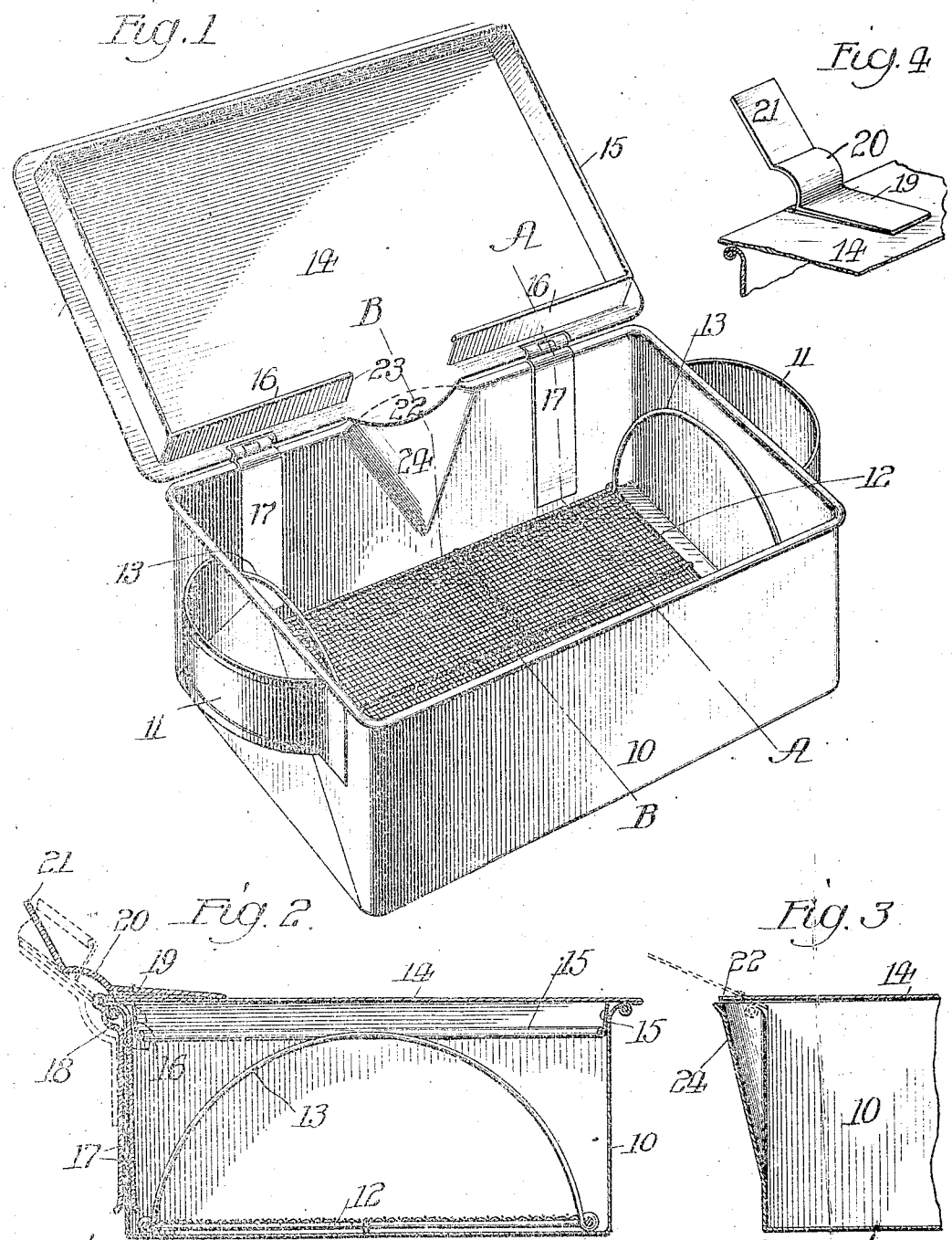
Witnesses:
Harold G. Barrett
M. B. Rieder
Inventor:
Peter A. Hanegraaf,
by John Howard McElroy
his Atty.

UNITED STATES PATENT OFFICE.

PETER A. HANEGRAAF, OF ROSSVILLE, ILLINOIS.

FAMILY COOK AND FRYING PAN.

No. 810,859.　　　Specification of Letters Patent.　　　Patented Jan. 23, 1906.

Application filed November 30, 1904. Serial No. 234,975.

*To all whom it may concern:*

Be it known that I, PETER A. HANEGRAAF, a citizen of the United States, residing at Rossville, in the county of Vermilion and State of Illinois, have invented certain new and useful Improvements in a Family Cook and Frying Pan, of which the following is a specification.

My invention is concerned with a novel cooking utensil designed, primarily, for family use and which can be employed for frying, baking, or roasting.

The novel features of my invention are embodied in certain constructions whereby the apparatus is capable of certain novel uses and presents certain advantages in its ordinary use.

I will in the body of the specification describe the complete apparatus and its uses and will specifically point out the features of novelty in the claims.

To illustrate my invention, I annex hereto a sheet of drawings, in which the same reference characters are used to designate identical parts in all of the figures, of which—

Figure 1 is a perspective view of the apparatus with the cover opened and in position to receive the draining-tray in the manner to be described. Fig. 2 is a vertical section on the line A A of Fig. 1, but with the cover shown as closed in its full-line position. Fig. 3 is a similar view in section on the line B B of Fig. 1, and Fig. 4 is a perspective view of one of the stops for holding the cover in its open inclined position.

The pan proper, 10, may be of any desired shape and construction for some purposes of my invention; but with the specific form of the cover illustrated the rectangular form shown adapts itself most readily to carrying out the invention. It is preferably provided with the handles 11, by which it can be lifted and transported. Where it is to be used for frying and roasting, some form of a drip-tray or screen 12 is preferably employed, and I have shown as a conventional form one provided with the framework covered by the screen and having the bails or handles 13 at its ends, by which it can be lifted, with its contents, out of the pan. Of course it will be understood that I do not limit myself to the employment of any particular form, style, or shape of tray.

The essential novel features of my invention are concerned with the cover 14, which will be of the proper shape to cooperate with the pan with which it is used and which is preferably provided on its under surface with the downwardly-extending flange 15, which is of the proper shape and location to cooperate with the inner edge of the top of the pan and form a substantially liquid-proof joint when closed, so that if the contents of the pan should splash about in handling it they cannot escape. The cover is hinged to the pan at one side by the hinges 16, which are preferably removable in order that the cover may be quickly removed from the pan to facilitate its cleaning or in case it is to be used without the cover. These removable hinges might be of any desired construction, but I preferably form them of strong steel having the elongated clip-like arms 17, which are adapted to be forced over the rim of the pan at the proper side and embrace the side of the pan snugly and with sufficient force to hold the cover in place under ordinary usage. In order that the hinges may fit over the preferably wired rim of the pan, they are provided with the loop portions 18. Upon the top of the cover, preferably just over the leaves 19 of the hinges 16, secured to the cover, I secure the stop-pieces 20, which are of the shape shown in detail in Fig. 4 and which are adapted to have the under side of the extensions 21 thereof rest against the back side of the pan or the hinges when the cover is thrown back, as shown in full lines in Fig. 1 and as indicated in dotted lines in Fig. 2. These stop-pieces 20 serve to hold the cover in the inclined position, (shown in Fig. 1,) and the object of employing them and holding the cover in this inclined position is so that after a batch of cakes or any similar articles are fried in grease the tray 12 may be lifted by the handles 13 and set on the cover 14 as it is turned back, being held in position by the lowermost side of the flange 15. While the cakes are draining in this position, another tray may be inserted, and when the pan is recharged the batch just cooked will be drained sufficiently to be set aside. In order that the drainings may run back into the pan, I provide the extension 22 on the adjacent edge of the cover, which extension extends over the edge of and into the pan, and in order that the drainings may run over this extension, and consequently run into the pan, I provide the break or recess 23 in the flange 15 to permit of the passage of the drainings. To permit of the turning of this cover down into its closed position in spite of the extension 22, I provide in the side of the pan the shallow spout or lip 24, which not only serves its function of permitting the cover to be turned down without interference from the extension 22, but which when the cover is removed and the contents of the pan are to be emptied serves as a spout in pouring out its contents.

While I have described the novel features of my apparatus as used in connection with frying and draining off the grease used in the process, it will be understood that it is capable for use in baking and roasting.

It will be apparent that by employing the pan with the cover, as shown, having the flange tending to seal the cover in the pan it is less dangerous to handle, as if its contents are agitated carelessly or by an accident there is very little danger of their splashing out and burning the user.

While I have shown and described my invention as embodied in the form in which I at present consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States, is—

1. In a device of the class described, the combination with the pan, of the cover therefor, hinged thereto, and adapted to be turned back to support a dripping-tray, means for holding the dripping-tray in position on the turned-back cover, and means for permitting the drippings to flow back from the cover into the pan.

2. In a device of the class described, the combination with the pan, of the cover therefor hinged thereto, means for holding the cover open and in an inclined position relative to the pan and in position to receive a dripping-tray, means for holding the dripping-tray thereon, and means for permitting the drippings to flow from the cover over the edge of and into the pan.

3. In a device of the class described, the combination with a pan, of the cover therefor hinged thereto and provided with the interior flange, and means for holding the cover open and in an inclined position, said flange being provided with an opening adapted to allow the drippings to flow from the cover over the edge of and into the pan.

4. In a device of the class described, the combination with the pan, of the cover therefor hinged thereto and provided with an interior flange, means for holding the cover open and in an inclined position relative to the pan, an extension on the cover adjacent an opening provided in the flange, and an offset in the side of the pan to permit of the cover turning; all substantially as and for the purpose described.

In testimony whereof I have signed my name to this specification in the presence of two subscribing witnesses.

PETER A. HANEGRAAF.

Witnesses:
   J. E. McCARTY,
   J. L. WEBSTER.